No. 851,321. PATENTED APR. 23, 1907.
A. T. SHEWARD.
FEED CUTTER.
APPLICATION FILED SEPT. 20, 1905.
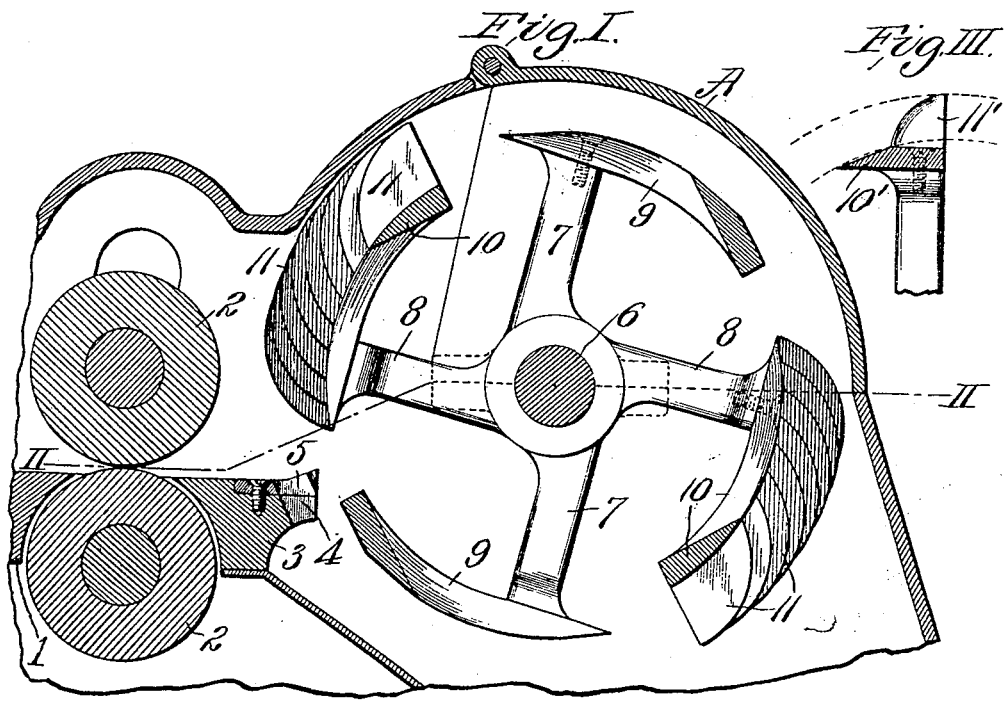
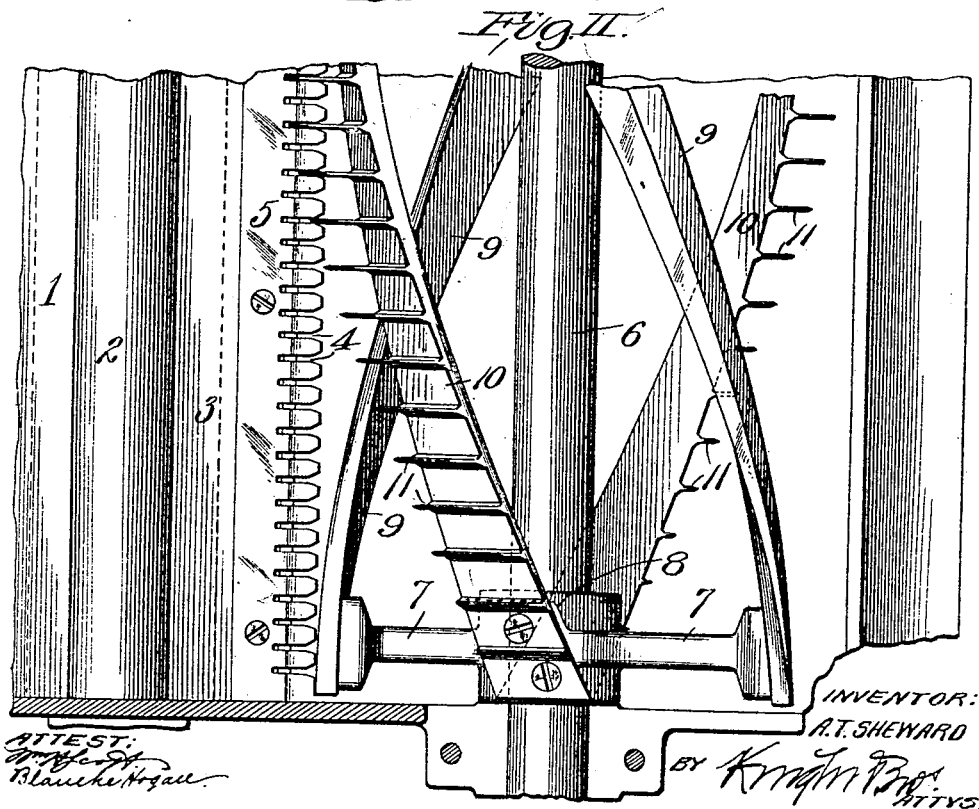

UNITED STATES PATENT OFFICE.

ASHLEY T. SHEWARD, OF ST. LOUIS, MISSOURI.

FEED-CUTTER.

No. 851,321.      Specification of Letters Patent.      Patented April 23, 1907.

Application filed September 20, 1905. Serial No. 279,210.

*To all whom it may concern:*

Be it known that I, ASHLEY T. SHEWARD, a subject of the King of Great Britain, residing in the city of St. Louis and State of Missouri, have invented certain new and useful Improvements in Feed-Cutters, of which the following is a full, clear, and exact description, reference being had to the accompanying drawings, forming part of this specification.

My invention relates to that class of cutting or chopping machines used for cutting hay, straw or similar feed for cattle or other stock, the object of the invention being to provide a machine in which the feed may be cut in both a transverse and longitudinal direction in order that the straws being fed into the machine will be chopped into approximately uniform lengths; notwithstanding the fact that portions of them may lie crosswise of the other straws as they are fed to the cutter box.

Figure I is a transverse section taken through a feed cutter constructed in accordance with my invention. Fig. II is a top or plan view of the cutter with the upper portion of its casing removed. Fig. III is a view partially in elevation and partially in cross section of a modification of one of the cutter bars.

A designates the casing of my feed cutter which may be of any form common to feed cutting machines.

1 designates a feed table and 2 feed rollers by which the feed, such as straw or hay, is fed from the feed table to the chamber within the casing A.

3 designates a cutter bar located in the throat of the casing A adjacent to the feed rollers 2 and which is provided with vertical slots 4 preferably of V-shape. The cutter bar is preferably surmounted by a slotted cutter plate 5, preferably of hardened steel, and against which the feed is cut as it passes over the cutter bar into the casing A. The cutter plate may, however, be omitted and the feed be cut directly against the cutter bar.

6 designates a shaft extending longitudinally through the casing A and adapted to be driven by power applied thereto in any suitable manner. This shaft has fixed to it within the casing, spiders having arms 7 and 8.

9 are cutter blades carried by the spider arms 7 and adapted to be rotated so that their cutting edges will approach into close proximity with the cutter bar 3 or the cutter plate 5 thereon. These cutter blades 9 are preferably of spiral form so that they will act in a shearing manner upon the feed carried over the cutter bar to cut it as it is fed into the casing chamber from the feed table.

10 designates blades, preferably of spiral form, carried by the spider arms 8 and located nearer to the shaft 6 than the cutter blades 9. The blades 10 move in a circular path causing the blades to approach the cutter bar 3 and move past it at a distance therefrom which is sufficient to avoid contact of the blades with the feed delivered onto the cutter bar. Each of the blades 10 carries a plurality of transverse cutting knives 11 that are adapted to pass through the slots in the cutter plate 5 and the slots in the cutter bar 3 during the rotation of the blades 10, or which pass only through the slots in said cutter bar when the cutter plate is omitted. These cutting knives act to cut in a direction corresponding to the direction of introduction of the feed passed over the cutter bar 3, whereby any of the straws that may lie cross-wise of the straws being fed straightforward into the casing will be cut by said knives 11.

By so positioning the blades 10 which carry the transverse cutting knives 11 that they will not contact with the feed delivered onto the cutter bar, I provide for the cutting of the feed by the transverse knives in the desired manner and avoid expenditure of power that would be necessary to drive the blades 10 with cutting action, which is work there is no necessity of their performing as the cutter blades 9 are amply sufficient to perform the cross cutting action in the machine.

In Fig. III I have shown a modification in which a blade 10' is provided with a cutting edge and also carries the transverse cutting knives 11'. By so constructing the blades they may contain both the transverse and longitudinal cutting features and combine the elements of the blades 9 and the transverse cutting knives 11. In using the parts in this modified form the blades 10' would, it will be understood, be so disposed as to cause their cutting edges to travel into close proximity with the cutter bar 3 or its cutter plate 5.

I claim as my invention:

1. In a feed cutter, the combination of a slotted cutter bar, a slotted plate surmounting said cutter bar, a blade, means by which said blade is rotatably carried, and a plurality of cutting knives carried by said blade and arranged to operate through the slots in said cutter plate and cutter bar, substantially as set forth.

2. In a feed cutter, the combination of a slotted cutter bar, a rotatable shaft, a cutter blade carried by said shaft and arranged to move in a circular path for cutting action upon the material fed onto said cutter bar, a second non-cutting blade carried by said shaft and located nearer said shaft than said first named blade, whereby it is caused to move in a circular path without action upon the material delivered onto said cutter bar, and a plurality of cutting knives arranged transversely on said last named blade and adapted to operate through the slots in said cutter-bar, substantially as set forth.

3. In a feed cutter, the combination of a slotted cutter bar, a rotatable shaft, a spiral cutter blade carried by said shaft and arranged to move in a circular path for cutting action upon the material fed onto said cutter bar, a second non-cutting spiral blade carried by shaft and located nearer said shaft than said first named blade, whereby it is caused to move in a circular path without action upon the material delivered onto said cutter bar, and a plurality of cutting knives arranged transversely on said last named blade and adapted to operate through the slots in said cutter bar, substantially as set forth.

ASHLEY T. SHEWARD.

In presence of:
  E. S. KNIGHT,
  BLANCHE HOGAN.